(12) United States Patent
Fröjdh et al.

(10) Patent No.: US 7,048,449 B2
(45) Date of Patent: May 23, 2006

(54) OPTICAL SUB-ASSEMBLY

(75) Inventors: Krister Fröjdh, Älvsjö (SE);
Lars-Göte Svenson, Sollentuna (SE);
Tedros Tsegaye, Stockholm (SE);
Mikael Wickström, Järfälla (SE)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/492,649

(22) PCT Filed: Oct. 17, 2002

(86) PCT No.: PCT/SE02/01895

§ 371 (c)(1),
(2), (4) Date: Aug. 17, 2004

(87) PCT Pub. No.: WO03/034121

PCT Pub. Date: Apr. 24, 2003

(65) Prior Publication Data
US 2004/0258364 A1  Dec. 23, 2004

(30) Foreign Application Priority Data
Oct. 19, 2001  (SE) .................................. 0103486
Mar. 1, 2002  (SE) .................................. 0200620

(51) Int. Cl.
*G02B 6/42* (2006.01)
(52) U.S. Cl. .......................................... 385/88; 385/93
(58) Field of Classification Search ............. 385/88–94
See application file for complete search history.

(56) References Cited

U.S. PATENT DOCUMENTS

| | | | | |
|---|---|---|---|---|
| 5,515,469 A | * | 5/1996 | Zarem et al. | ............... 385/92 |
| 5,642,450 A | * | 6/1997 | Oda | ......................... 385/60 |
| 6,035,664 A | | 3/2000 | Hashizume | |
| 6,040,934 A | * | 3/2000 | Ogusu et al. | ............. 398/139 |
| 6,071,016 A | | 6/2000 | Ichino et al. | |
| 6,126,325 A | * | 10/2000 | Yamane et al. | ............ 385/92 |
| 6,540,412 B1 | * | 4/2003 | Yonemura et al. | ......... 385/88 |
| 6,799,901 B1 | * | 10/2004 | Yoshimura et al. | ........ 385/88 |

FOREIGN PATENT DOCUMENTS

WO   WO 9834146 A1   8/1998

OTHER PUBLICATIONS

Copy of International Search Report for PCT/SE02/01895, dated Dec. 27, 2002.

* cited by examiner

*Primary Examiner*—Sung Pak
*Assistant Examiner*—Mike Stahl
(74) *Attorney, Agent, or Firm*—Workman Nydegger

(57) ABSTRACT

An optical sub-assembly is disclosed, having a mating end adapted to receive a mating fiber, and a back end provided with a converging lens establishing an expanded beam interface with an optical device. The use of an expanded beam interface provides greatly improved stability, and reduces the sensitivity to slight misalignments The optical sub-assembly comprises a receptacle for which the manufacturer thereof has full control over the optical interfaces and refractive index boundaries. The receptacle and the optical device may be manufactured separately.

14 Claims, 4 Drawing Sheets

OPTICAL SUB-ASSEMBLY

FIELD OF THE INVENTION

The present invention relates to an optical sub-assembly, and to an optical receptacle for use in this optical sub-assembly. In particular, the present invention relates to an optical sub-assembly having a mating end adapted to receive a mating fiber, and a back end adapted to be optically connected to an optical device.

BACKGROUND OF THE INVENTION

In general, an optical receptacle is an optical device that accepts an optical fiber connector to connect to another optical device, such as a laser diode, a photodetector, or another optical fiber. Optical connectors are standardized in order to fit into receptacles from different manufacturers. Common standards are for example SC-connectors and LC-connectors.

Optical input to and output from an optical device is passed through the receptacle, which is connected to the device. When light is launched into or taken out from an optical fiber, it is passed through a refractive index boundary. A refractive index boundary is also a requisite for refracting the light, for the purpose of collimating or focusing.

At the mating end (the end which is to be inserted into a receptacle) of a fiber connector, there is typically arranged a ferrule in which the fiber is fitted. This ferrule is inserted into the optical receptacle in order to connect the fiber therein to the optical device connected to the receptacle.

In order to reduce back-reflections, the tip of the mating fibre is generally anti-reflection coated or angle-cut. In some configurations an optical insulator, which is a rather bulky device, is employed. Requirements are put on both the connector and on the receptacle in order to provide good optical throughput to or from an optical device, and to minimize back-reflections from the fiber end. However, the fiber connector and the receptacle are generally not manufactured by the same manufacturer. Since the degree of optical throughput is dependent on both the quality of the connector and the quality of the receptacle, the manufacturer of the receptacle thus cannot guarantee certain specifications of optical throughput irrespective of the type of connector used and the quality of the mating fiber.

The degree of optical throughput also depends on the interface between the receptacle and the optical device arranged at the back end thereof, to which the mating fiber is to be optically connected by means of the receptacle. Any disturbances of the position of a laser or a photodetector relative to the receptacle will result in a degradation of the optical throughput.

U.S. Pat. Nos. 6,071,016 and 5,617,495 are two examples of prior art optical receptacle solutions which address these problems.

In U.S. Pat. No. 6,071,016 a fiber stub is held by a sleeve and optically coupled to the mating optical fiber for connection. In this way, the nature of the refractive index step is determined by the end tip of the fiber stub, and not by the characteristics of the mating fiber. A lens on the back side of the fiber stub guides the incoming light to a photodetector unit. This increases the optical throughput, since the light can be focused directly to the active area on the photodetector. However, it is still very important that no misalignments occur between the receptacle unit and the photodetector, since the optical throughput will be drastically reduced if the focused light beam is not perfectly matched with the active area of the photodetector.

In U.S. Pat. No. 5,617,495 a short optical fiber has one end (a "pig tail") optically connected to a laser diode, and an opposite end housed in a ferrule, which is inserted into and fixed to a sleeve that is mounted in a module package. The mating fiber is optically coupled to this short optical fiber when the connector is connected. In this way, accurate alignment of the receptacle and the optical device is possible. However, the receptacle and the optical device have to be joined at assembly. It is not possible to manufacture the optical package and the receptacle separately, which may be desired.

Hence, there is a need for new optical receptacle solutions.

SUMMARY OF THE INVENTION

The present invention addresses the above-mentioned problems by providing an optical sub-assembly comprising an optical receptacle for which the manufacturer thereof has full control over the optical interfaces and refractive index boundaries. A sub-assembly according to the present invention allows the receptacle manufacturer to guarantee specifications virtually without any regard to the connector to be connected thereto, provided that the connecting fiber is adapted for the same kind of interfacing as the receptacle, such as physical contact interfacing. The refractive index boundary to the fiber resides entirely protected within the receptacle, inaccessible to the user who connects the optical connector, and it is substantially independent, within reasonable limits, of the quality of the end face of the connecting (mating) fiber. Furthermore, the optical connection between the receptacle and any optical device at the back side thereof is provided by an expanded beam of light. The use of an expanded beam path between the receptacle and the optical device provides greatly improved stability, and reduces the sensitivity to slight misalignments. Also, the receptacle and the optical device (e.g. a laser diode module) may be manufactured separately.

It is therefore an object of the present invention to provide a fiber optic sub-assembly comprising an integrated receptacle which allows the manufacturer thereof to have full control of the refractive index step at the fiber end, wherein separate manufacture of the receptacle and of any optical device to be connected thereto is facilitated by the sub-assembly having an interface that works with an expanded beam of light.

This object is met by an optical sub-assembly and an optical receptacle as defined in the appended claims. Hence, full control of the refractive index boundary at the fiber end is obtained by the receptacle having a junction member with a junction waveguide, preferably a ferrule fitted with a length of junction fiber. Light may pass between the junction waveguide and the mating fiber without experiencing any refractive index boundaries. A mating end of the junction waveguide is arranged to connect to the mating fiber, and a back end of the junction waveguide is entirely protected within a housing. Consequently, the refractive index boundary at the back end of the junction waveguide is entirely in the hands of the manufacturer of the receptacle. At the back end of the receptacle, there is provided a converging lens for focusing light from an expanded beam into the junction waveguide, and for expanding light coming from the junction waveguide into an expanded beam for interfacing an optical device at the back side of the receptacle.

According to one embodiment of the present invention, an optical receptacle comprises an outer housing and a resilient split sleeve arranged inside said outer housing. Inside the housing there is arranged a junction ferrule fitted with a length of optical fiber, which junction ferrule is at least partly clamped to the split sleeve by the resilient action thereof. The junction ferrule has a first end that is accessible by a user of the receptacle, and a second end that is protected within the outer housing and thus inaccessible by the end user. Adjacent said first end of said junction ferrule, the resilient split sleeve exhibits a receiving portion adapted to receive a mating ferrule. The resilient split sleeve ensures that the mating ferrule and the junction ferrule are kept in fixed and aligned relative positions at all times. Adjacent the second, protected end of the junction ferrule, there is arranged and aligned a lens for focusing light going into the length of fiber in the junction ferrule, and for collimating light coming out from said length of fiber. On the opposite side of the lens, there is typically arranged some optical device, such as a photodetector or a laser diode. Between the optical device and the lens, the light beam is expanded into a substantially collimated beam having a diameter that is considerably larger than for example the diameter of the fiber core. In this way, small deviations in the position of the receptacle relative to the optical device at its back end have less influence on the optical throughput.

In another embodiment of the present invention, the junction ferrule and the length of junction fiber fitted therein are replaced by a junction member in the form of a piece of glass having a waveguiding structure therein. A junction member in the form of a piece of glass may also comprise means for focusing, alignment and physical contact connection to the mating fiber.

The first end of the junction ferrule is generally termed the mating end, and the second end is termed the back end. The mating end is accessible for the end user for connection of a fiber connector, while the back end is protected within the outer housing at all times of usage.

Consequently, the second end face (the back end) of the length of fiber fitted in the junction ferrule is accessible only to the manufacturer of the receptacle. In this way, the manufacturer can have full control of the optical characteristics of this end face, and of the interface between the fiber back end and the lens that is provided in order to allow an expanded beam interface with any optical devices that are optically connected at the back end of the receptacle.

At the mating end of the junction ferrule, the fiber fitted therein is designed to have a physical contact interface with a fiber fitted in the mating ferrule. A physical contact interface at this end of the junction ferrule ensures that back reflections and insertion losses at this interface are minimized. As known in the art, a physical contact interface is an interface without any refractive index boundaries.

The receptacle according to the present invention provides some attractive advantages compared to prior art devices.

Firstly, by having the control of the optical interfaces, for example between a light guiding core in an optical fiber and a surrounding medium such as air, the manufacturer can assure that the optical characteristics, such as losses, are within specified limits.

Furthermore, the arrangement of a lens within the housing at the back end of the junction waveguide, which lens is adapted to interface with an expanded beam of light, provides greater stability and less sensitivity to movements or slight misalignments for an optical connection with a device such as a laser diode or a photodetector.

Also, working with an expanded light beam facilitates the connection of the receptacle to an optical module. In particular, the receptacle according to the invention is conveniently assembled with a hermetically packaged diode laser module. Such a laser module can be equipped with a collimating lens, such as a ball lens, in order to provide a collimated and expanded output beam from the module. Hence, the inventive receptacle is designed to interface with this expanded beam, and to utilise the nature of the expanded beam to achieve increased stability and reduced sensitivity to movement and slight misalignments between the receptacle and the laser module. In addition, an optical isolator may conveniently be provided in the beam path between the receptacle and the laser module in order to prevent any reflections from going back into the laser.

Similar reasoning can be given for the situation where the receptacle is optically connected to any other optical device, such as a hermetically packaged photodiode module.

The beam of light in the interface region between the receptacle and any optical device behind the converging lens need not be perfectly collimated, but may even be divergent. However, it is still a requisite that the lens defines an optical path between the junction waveguide and the interface region.

Another embodiment of the present invention is directed towards reducing any hazardous effects of stray light that may emerge from a receptacle when no mating fiber is connected thereto. A light source, such as a laser diode, fitted in a laser module that is optically connected to the receptacle, may continue to emit light even if no mating fiber is connected. In such a case, the eye-safety of the device may be compromised. Therefore, in some embodiments of the present invention, the junction fiber in the junction ferrule is made with a light absorbing cladding. Thus, any light from the laser diode not coupled into the core of the junction fiber will be strongly absorbed in the cladding. Only light from the core of said fiber may then emerge from the opposite side of the fiber.

In a typical example, less that about half the light from the laser diode is coupled into the core of the fiber. The light that is not coupled into the core will propagate as unguided light in the cladding. In some cases, the laser diode and the fiber are deliberately misaligned in order to reduce the coupled power to a desired level. In such a case, even more light will propagate in the cladding of the fiber.

Improved eye-safety is provided, according to the present invention, by removing unguided light from the cladding by means of absorption. Typically, absorption of said unguided light is effected by the cladding of the junction fiber being doped with an attenuating species, such as cobalt dioxide. Preferably, the cladding of the fiber has an inner portion substantially without any absorption, in order to minimize losses of the light that is guided in the core.

Yet another embodiment of the present invention is directed towards increasing the transmission distance range by increasing the dynamic range of allowed input power into a receptacle. A light detector, such as a photodiode, fitted in a receiver module that is optically connected to the receptacle, has a limited dynamic range. When the power of the input light is too low (e.g. because the transmission distance is very long), it will fall below the sensitivity limit for the detector, and no light at all will be detected. When the power of the input light is too high (e.g. because the transmission distance is very short), it will cause errors due to detector overload.

Therefore, in some embodiments of the present invention, the junction fiber in the junction ferrule is made of a material in which the absorption increases with the power of the input light. Thus, the light from the optical fiber can be amplified enough for weak light to be detected by the detector, and if the power of the light becomes too high, the absorbing material in the junction fiber will ensure that detector overload is avoided.

BRIEF DESCRIPTION OF THE DRAWINGS

The features of the invention will become apparent from the following detailed description of some preferred embodiments. In the detailed description, reference is made to the accompanying drawings, of which.

Throughout the drawings, like parts are designated like reference numerals.

DETAILED DESCRIPTION OF THE INVENTION

Preferred embodiments of the present invention will now be described with reference to the accompanying drawings.

Figure 1:
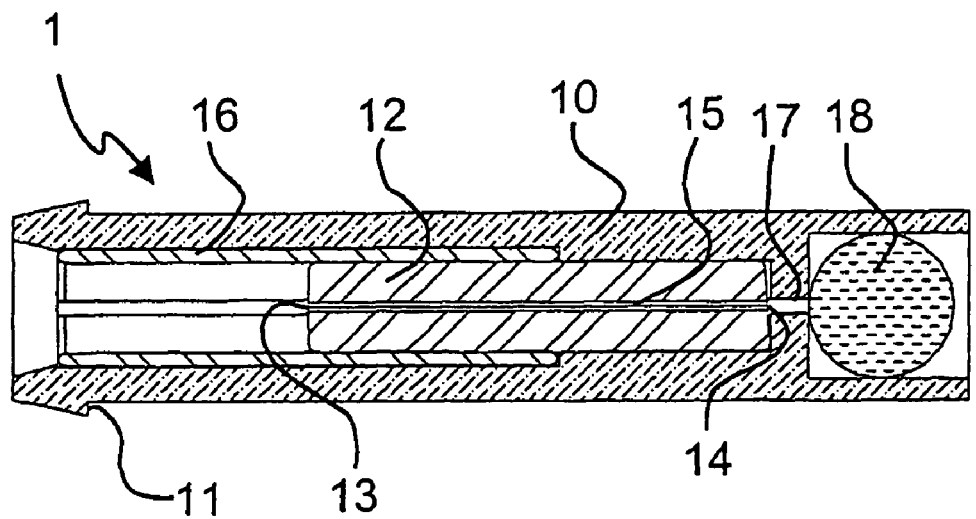
FIG. 1 is a schematic cross-section of the optical receptacle according to the invention.

FIG. 1 shows a preferred embodiment of an optical receptacle 1 according to the present invention. The receptacle comprises a generally cylindrical, or tubular, housing 10 having a generally cylindrical space of varying diameter formed therein. On the outer surface of the housing 10 there is formed a circumferential shoulder 11, which is used for alignment purposes during manufacture. The housing 10 can be made from any rigid material, such as plastic or metal (e.g. stainless steel).

Inside the housing 10, a junction ferrule 12 is fixed, with its longitudinal axis substantially parallel to the longitudinal direction of the cylindrical housing 10. The junction ferrule 12 is preferably a standard ceramic ferrule. The junction ferrule has a mating end 13 and a back end 14, and is fitted with a length of fiber 15, preferably a single mode fiber. A resilient split sleeve 16 is clamped around the junction ferrule 12 such that a first portion of the sleeve 16 surrounds the mating end 13 of the junction ferrule 12, and a second portion of the sleeve projects away from the mating end of the ferrule and is adapted to receive a mating ferrule. The resilient split sleeve 16 is not necessarily attached, or fixed, to the interior of the housing 10, and need not be radially aligned inside said housing. However, inward projecting lips 31 in the housing ensure that the sleeve 16 remains in the housing when a mating ferrule is inserted or removed. Although not necessarily aligned within the housing 10, the split sleeve 16 is always aligned with the junction ferrule 12, to which it is clamped.

Hence, the split sleeve 16 has a receiving portion adapted to receive the mating ferrule. Facing this receiving portion of the split sleeve is the mating end 13 of the junction ferrule. When a mating ferrule is inserted into the receiving portion of the sleeve, said mating ferrule is automatically aligned with the junction ferrule by means of the resilient split sleeve 16 surrounding, and being clamped to, both of said ferrules. In the preferred embodiment, the split sleeve is made from ceramic zirconia.

In the optical path adjacent the back end 14, there is an air gap 17. This air gap is preferred since it facilitates automated manufacturing and allows collimation and focusing of light passing to or from the junction fiber 15. Typically, collimation or focusing is obtained by means of a lens 18, such as a ball lens, positioned within the housing 10. The lens 18 defines an optical path between the back end 14 of the junction fiber 15 and a collimated, expanded beam of light outside the receptacle. Hence, the receptacle is designed to be optically connected to an optical device on the back side thereof by an expanded beam interface. The use of an expanded beam interface has several advantages, as has been discussed above. A preferred selection of lens is a ball lens of BK 7 glass, having a diameter of 2 mm. Nevertheless, it is to be understood that lenses of other diameters may be used. Furthermore, the ball lens is preferably anti-reflection coated for the relevant wavelength regions, namely from about 1310 nm to about 1550 nm, and preferably slightly extended to range from about 1300 nm to about 1600 nm. It is also possible to have a lens that is anti-reflection coated for a dedicated, narrower, wavelength region, such as for the 1310 nm band or the 1550 nm band.

Typically, the receptacle is assembled with a diode laser module or a photodetector module. The use of an expanded beam path between the receptacle sub-assembly and the laser module or the photodetector module provides greatly improved stability, and reduces the sensitivity to slight misalignments. It is to be noted that the laser module is preferably hermetically sealed. The optical interface provided by the receptacle according to the present invention allows manufacturing of the laser module without having to incorporate connections to the receptacle, in contradistinction to prior art devices in which the receptacle and the laser module typically need to be manufactured at the same time due to the necessity to connect a fiber ("pig tail") from the receptacle directly to the laser. Hence, one of the clear advantages of the present invention is that the receptacle may be manufactured completely separate from the laser module with which it is to be assembled.

Figure 2:
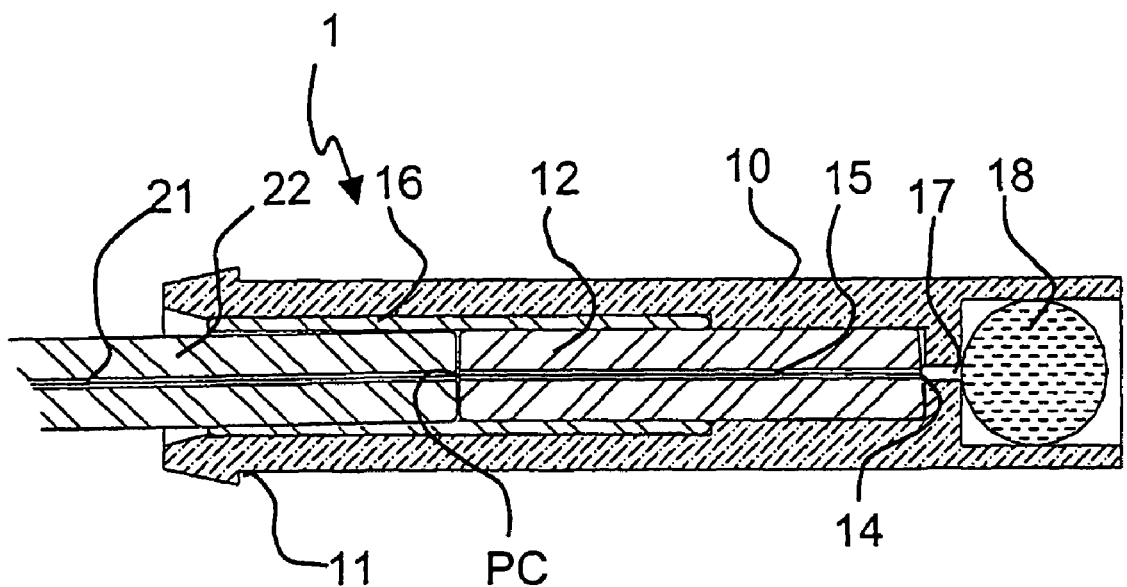
FIG. 2 is a schematic cross-section of the optical receptacle when connected to a mating ferrule.

FIG. 2 schematically shows the optical receptacle 1 according to the present invention when a mating ferrule 22 is inserted, or connected, therein. At the mating end 13 of the junction ferrule 12, the fiber 21 in the mating ferrule 22 preferably comes into physical contact (PC) with the length of fiber 15 in the junction ferrule 12. However, other types of connection, other than physical contact connection, are also possible. In effect, there is no refractive index boundary at the interface between the mating fiber 21 and the junction fiber 15. The mating ferrule 22 and the junction ferrule 12 are kept aligned by the resilient sleeve 16, being clamped to both of said ferrules and keeping them in place.

The back end 14 of the junction ferrule 12, and hence of the length of fiber 15 fitted therein, is enclosed within the housing 10 of the receptacle 1. The back end 14 is not accessible by any user of the receptacle 1. Therefore, the manufacturer can have full control of the characteristics of the interface to the fiber at the back end 14. The point where light is launched into the fiber or extracted out from the fiber (namely the back end 14) cannot be tampered with by users or operators. In this way, the manufacturer of the receptacle 1 according to the present invention can guarantee certain specifications for the coupling of the light into or out from the fiber 21 connected thereto. For example, an anti-reflection coating of desired quality may be deposited on the back end face of the junction fiber 15, or the back end face 14 of the fiber 15 may be polished or cut at an angle, in order to reduce back-reflections and avoid formation of resonant cavities in the optical path. In any circumstance, the control of the nature of the back end 14 of the fiber is in the hands of the manufacturer.

Figure 3:
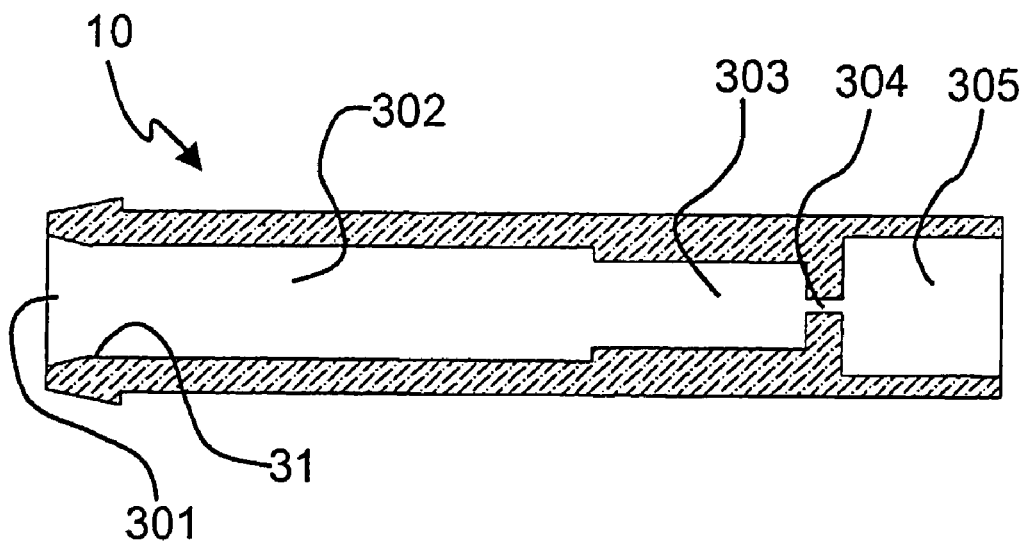
FIG. 3 is a schematic cross-section of the receptacle housing, FIG. 4 schematically shows the back end of a receptacle according to the present invention, optically coupled to a laser diode package, wherein the coupling is an expanded beam interface, FIG. 5 schematically shows a junction fiber without attenuating cladding, FIG. 6 schematically shows a junction fiber with attenuating cladding.

In FIG. 3, the housing 10 of the receptacle is shown without any internal parts inserted. The housing 10 is generally tube-like, with a longitudinal space of varying diameter formed therein. The outer diameter of the housing is about 2.6 mm, and the total length is about 13 mm. It is to be understood that the housing may be formed in one piece, into which the junction member, the resilient sleeve and the ball lens are inserted. Alternatively, the housing may be formed in two or more pieces, which could facilitate the fabrication thereof.

The space in the housing 10 can be regarded as being comprised of a number of different portions. The different portions will now briefly be listed, starting from the front end of the receptacle (the side from which a mating ferrule is inserted).

First there is a guiding portion 301 with slightly slanting walls, in order to facilitate both the introduction of the junction ferrule and the resilient sleeve during manufacturing, and the insertion of a mating ferrule during use. The guiding portion 301 is terminated by an annular lip or flange 31 projecting inwards. The purpose of this lip 31 is to keep the resilient sleeve in place inside the housing.

Then there is a mating portion 302, in which the resilient sleeve is inserted. The diameter of the mating portion 302 is slightly larger than the diameter of the sleeve, in order to allow the sleeve to resiliently expand and clamp around the ferrules inside the housing.

Next to the mating portion 302, there is a holding portion 303 for the junction ferrule. During manufacture, the junction ferrule, including the length of junction fiber, is inserted and fixed into the holding portion 303 in an accurate position. When the junction ferrule is in place, the resilient sleeve is inserted into the mating portion 302, clamped to and partly surrounding the junction ferrule. In this way, the sleeve will always be collinear with the junction ferrule, and hence assure alignment with any mating ferrule when such is inserted into the receiving portion of the sleeve.

In the light path next to the holding portion 303, there is a lens portion 305. The lens portion may comprise for example a ball lens, as shown in FIGS. 1 and 2. However, it is to be understood that other types of lenses may be arranged in the portion 305 of the housing 10. Typically, the inner diameter of the lens portion is roughly the same as the outer diameter of the lens that is to be arranged therein.

Between the holding portion 303 and the component portion 305 there is a small air gap 304, through which light propagates freely. The length and diameter of this air gap 304 is typically designed to agree with the beam properties required in the lens portion 305 for allowing a collimated and expanded beam on the opposite side of the lens. In the preferred embodiment, employing a ball lens of BK b glass with a diameter of 2 mm, the distance between the back end of the junction waveguide and the face of the lens is about 0.6 mm.

Figure 4:
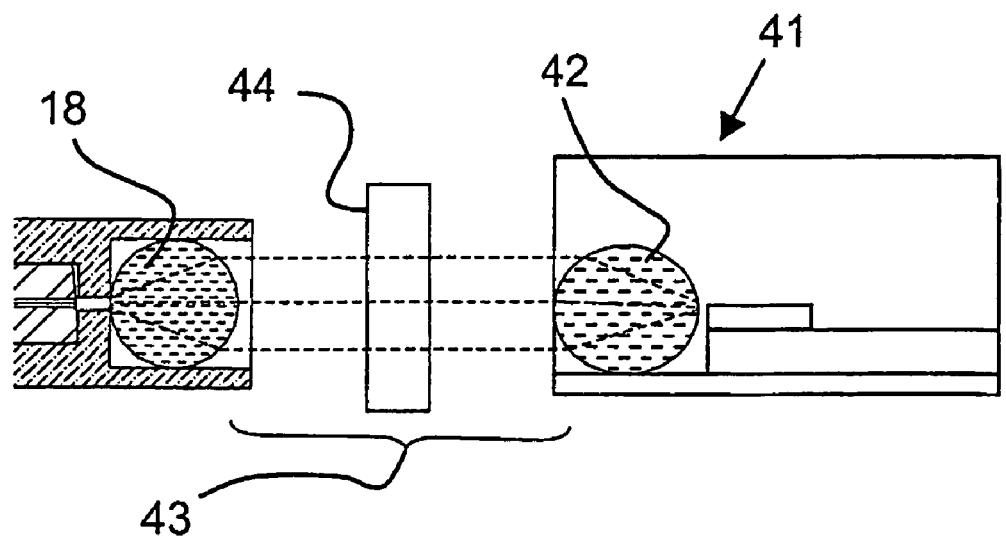

FIG. 4 schematically shows a receptacle according to the present invention, which is optically coupled to a laser diode package 41 by an expanded beam interface. The region in which the laser beam is expanded to an increased diameter is shown by the bracket at reference numeral 43. Light emitted by the laser chip in the laser diode package 41 is expanded, and substantially collimated, by a lens 42. The lens 42 is preferably arranged within the laser diode package, as shown in the figure. Thus, an expanded laser beam is output from the laser diode package, thereby facilitating optical coupling to the receptacle. The expanded beam is aligned with the ball lens 18 in the receptacle, whereby the beam is focused onto the back end face of the junction waveguide in the receptacle. Advantageously, any optical component 44, such as an optical isolator, may be provided in the expanded beam path between the laser diode package and the receptacle. By referring to FIG. 4, one of the main advantages of the present invention becomes clear, namely that the laser diode package 41 and the receptacle may be manufactured at different sites, and subsequently assembled into the optical sub-assembly shown in the figure. At the assembly, the optical isolator, or any other optical component, may be suitably arranged as shown.

It is of course possible to employ a similar type of arrangement as that shown in FIG. 4 when the receptacle is optically connected to a photodetector module.

Furthermore, it is preferred that the junction waveguide of the present invention is provided with light-absorbing cladding, with the purpose of reducing possible eye-safety hazard if a mating fiber is removed while a light source, optically connected to the receptacle, is still emitting light. This additional feature will be described next, with reference to FIGS. 5–7 of the accompanying drawings.

Figure 5:
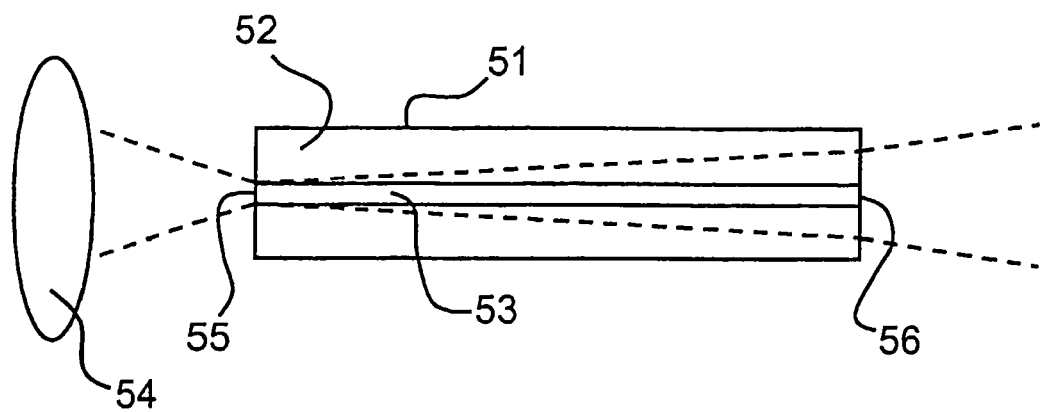

FIG. 5 schematically shows a piece of fiber 51, acting as the junction waveguide of the present invention, having no additional absorption in its cladding 52. In this case, light coupled from the left in the figure (the light being indicated in the figure by dashed lines) and focused onto an end portion 55 of the core 53 of the fiber 51 by means of a lens 54, will partly propagate in the cladding 52 of the fiber 51, since not all of the light is actually coupled into the core 53. In some cases, light is even deliberately not coupled into the core, in order to reduce the optical power of the guided light. However, the non-guided light in the cladding 52 of the fiber will propagate freely towards the mating end 56 thereof. If no mating fiber is connected to the receptacle, any light in the fiber (be it in the core 53 or the cladding 52 thereof) will emerge on the other side 56. Consequently, the non-guided light in the cladding 52 adds to the total optical power emitted from the receptacle, and may increase the risk for eye-damage to any user. Therefore, it is proposed herein that the cladding 52 of the fiber is made absorbing for the desired wavelengths of light, such that non-guided light in the cladding is absorbed and prevented from emerging at the mating end 56 of the fiber 51.

Figure 7:
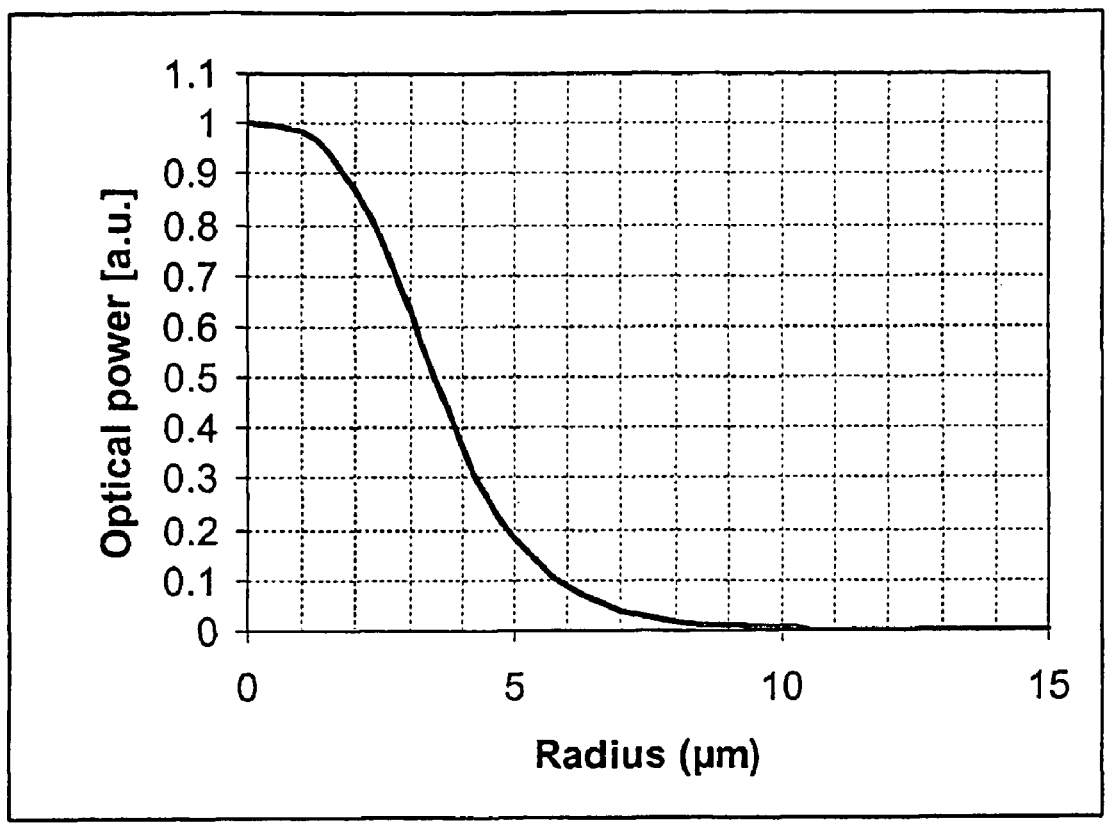
FIG. 7 shows a graph of the amount of optical power outside a radius of x for a standard fiber having a core diameter of about 8.2 μm.

Referring now to FIG. 7, the optical power for guided light outside a radius x in a standard fiber is shown schematically. The graph of FIG. 7 shows the situation for a step index single mode fiber of the type SMF-28™, which is commercially available from Corning®. The core index of the fiber is about 1.468 and the index step is about $\Delta=0.36\%$. The core diameter of the fiber is about 8.2 μm. As seen from the graph of FIG. 7, less than 10% of the optical power is outside of a radius of 6 μm, and less than 1% of the optical power is outside of a radius of 9 μm. This means that if the cladding material outside a radius of 9 μm is doped to a material attenuation of 50 dB/cm, the attenuation for the guided light will be only 0.5 dB/cm. Therefore, non-guided light propagating in the strongly attenuating cladding will be sufficiently reduced in power before it reaches the other end of the fiber, thereby not contributing to any eye-safety hazard.

Figure 6:
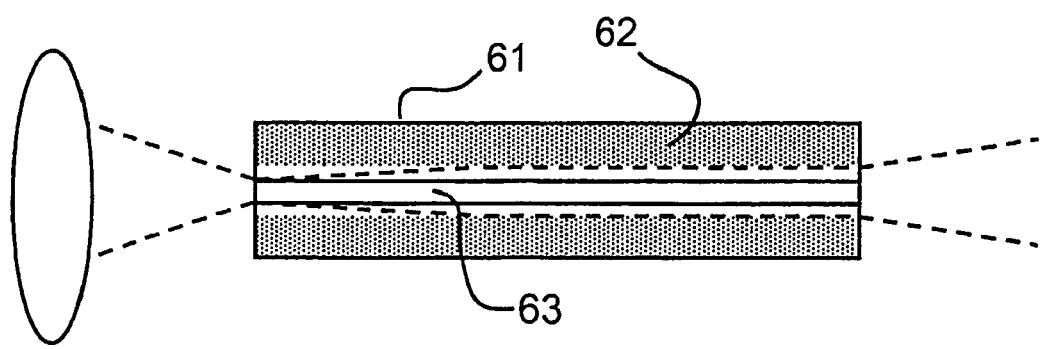

FIG. 6 shows schematically a fiber 61 in which an outer portion of the cladding 62 has been made light-absorbing. As in FIG. 5, light is indicated by dashed lines. The absorbing outer portion of the cladding 62 is shown by the dotted region of the fiber 61. It is to be noted that the absorption in the cladding 62 does not affect the guided light in the core 63 of the fiber more than the above-mentioned 0.5 dB/cm attenuation.

Preferably, the light-absorbing feature of the cladding 62 is obtained by doping cobalt oxide into the cladding material. However, other dopants are also conceivable in order to achieve a similar result. Of course, the attenuation should be adapted to the wavelength of the light to be absorbed, namely the emission wavelength of the light source (the laser diode).

The doping to achieve the absorption in the cladding 62 may or will lead to an increase of the refractive index thereof. Therefore, it may be necessary to compensate this index increase by raising the germanium content in the core 63, and possibly by adding some germanium to an inner portion of the cladding closest to the core (the non-absorbing part of the cladding).

The above-described additional feature of reducing stray light in order to minimize eye-safety hazards may be employed in any embodiment of the present invention.

Furthermore, it is preferred that the junction waveguide of the present invention is made of a material in which the absorption increases with the power of the input light, with the purpose of increasing the dynamic range of allowed input power into a receptacle. A light detector, such as a photodiode, fitted in a receiver module that is optically connected to the receptacle, has a limited dynamic range. When the power of the input light is too low (e.g. because the transmission distance is very long), it will fall below the sensitivity limit for the detector, and no light at all will be detected. When the power of the input light is too high (e.g. because the transmission distance is very short), it will cause errors due to detector overload.

Therefore, in some embodiments of the present invention, the junction fiber in the junction ferrule is made of a material in which the absorption increases with the light level. Thus, if the power of the light becomes too high, the absorbing material in the junction fiber will ensure that detector overload is avoided.

The above-described additional feature of increasing the dynamic range of allowed input power into a receptacle may be employed in any embodiment of the present invention.

Although the present invention has been described with reference to the accompanying drawings and the embodiments schematically shown thereon, it is to be understood that various modifications can be made without departing from the scope of the invention as defined in the appended claims. For example, the housing of the receptacle, particularly the outer surface thereof, may have a different shape than that shown.

The invention claimed is:

1. An optical receptacle for use in an optical sub-assembly, comprising:
   a generally tubular housing;
   a junction member fixed inside said housing, said junction member having a mating end which is accessible from one end of the housing, and a back end which is protected within the housing;
   a junction waveguide in said junction member, said junction waveguide having a mating end face at the mating end of the junction member and a protected back end face at the back end of the junction member; and
   a converging lens arranged within the housing at the back end of the junction member, said converging lens being aligned with the longitudinal axis of the junction waveguide, and said converging lens defining an optical path between the back end of the junction waveguide and a collimated expanded light beam outside the receptacle, wherein the optical receptacle comprises:
   a resilient sleeve located in and retained by said housing, said resilient sleeve clamped around said junction member and projecting away from the mating end thereof to form a receiving portion, said receiving portion being adapted to receive a mating ferrule, and to align and bring into optical contact a fiber fitted in the mating ferrule in physical contact with the mating end face in the junction waveguide.

2. An optical receptacle according to claim 1, wherein there is an air gap between the back end of the junction wave guide and the converging lens.

3. An optical receptacle according to claim 1, wherein the lens is anti-reflection coated for a wavelength range from about 1300 nm to about 1600 nm.

4. An optical receptacle according to claim 1, wherein the lens is anti-reflection coated for a wavelength range around 1310 nm, or for a wavelength range around 1550 nm.

5. An optical receptacle according to claim 1, wherein the junction member is a ferrule, and the junction waveguide is a length of fiber fitted in this ferrule.

6. An optical receptacle according to claim 1, wherein the junction member is a piece of glass, and the junction waveguide is a waveguiding structure in said piece of glass.

7. An optical receptacle according to claim 1, wherein the resilient sleeve is movably arranged in a radial direction inside the housing, and means are arranged for preventing the resilient sleeve from following the mating ferrule out of the housing when said mating ferrule is removed from the receptacle.

8. An optical receptacle according to claim 1, wherein the back end face of the junction waveguide is designed to reduce back-reflections and resonant cavities.

9. An optical receptacle according to claim 8, wherein the back end face of the junction waveguide is provided with an anti-reflection coating.

10. An optical receptacle according to claim 9, wherein the back end face of the junction waveguide is angled with respect to the longitudinal axis of the junction waveguide.

11. An optical transmitter, comprising:
    a hermetically sealed laser diode package which is operative to deliver a substantially collimated expanded beam of light out from the package, where the optical transmitter comprises:
    an optical receptacle comprising:
    a generally tubular housing;
    a junction member fixed inside said housing, said junction member having a mating end which is accessible from one end of the housing, and a back end which is protected within the housing;
    a junction waveguide in said junction member, said junction waveguide having a mating end face at the mating end of the junction member and a protected back end face at the back end of the junction member; and a converging lens arranged within the housing at the back end of the junction member, said converging lens being aligned with the longitudinal axis of the junction waveguide, and said converging lens defining an optical path between the back end of the junction waveguide and a collimated expanded light beam outside the receptacle, wherein the optical receptacle comprises:

a resilient sleeve located in and retained by said housing, said resilient sleeve clamped around said junction member and projecting away from the mating end thereof to form a receiving portion, said receiving portion being adapted to receive a mating ferrule, and to align and bring into optical contact a fiber fitted in the mating ferrule in physical contact with the mating end face in the junction waveguide, wherein the optical receptacle and the laser diode package being mutually aligned such that the expanded beam of light from the laser package is focused by the converging lens in the receptacle and thus coupled into the back end of the junction waveguide.

12. An optical transmitter according to claim 11, further comprising an optical isolator which is arranged between the laser package and the receptacle, said isolator passing light in the direction from the laser towards the receptacle, and blocking light in the opposite direction.

13. An optical receiver comprising:
an optical receptacle comprising:
  a generally tubular housing;
  a junction member fixed inside said housing, said junction member having a mating end which is accessible from one end of the housing, and a back end which is protected within the housing;
  a junction waveguide in said junction member, said junction waveguide having a mating end face at the mating end of the junction member and a protected back end face at the back end of the junction member; and
  a converging lens arranged within the housing at the back end of the junction member, said converging lens being aligned with the longitudinal axis of the junction waveguide, and said converging lens defining an optical path between the back end of the junction waveguide and a collimated expanded light beam outside the receptacle, wherein the optical receptacle comprises:
  a resilient sleeve located in and retained by said housing, said resilient sleeve clamped around said junction member and projecting away from the mating end thereof to form a receiving portion, said receiving portion being adapted to receive a mating ferrule, and to align and bring into optical contact a fiber fitted in the mating ferrule in physical contact with the mating end face in the junction waveguide; and
a hermetically sealed photodetector package which is arranged to receive a substantially collimated expanded beam of light from said optical receptacle,
the optical receptacle and the photodetector package being mutually aligned such that light from the junction waveguide in the receptacle is expanded and collimated by the converging lens and directed onto a sensing area of the photodetector.

14. An optical receiver according to claim 13, further comprising an optical isolator arranged between the photodetector package and the receptacle, said isolator passing light in the direction from the receptacle towards the photodetector, and blocking light in the opposite direction.

* * * * *